Jan. 19, 1932. M. LOUGHEAD 1,841,614
BRAKE MECHANISM
Filed Nov. 6, 1928 2 Sheets-Sheet 1

Inventor
Malcolm Loughead
By Williams, Bradbury, McCaleb & Hinkle
Attys.

Jan. 19, 1932.   M. LOUGHEAD   1,841,614
BRAKE MECHANISM
Filed Nov. 6, 1928   2 Sheets-Sheet 2

Inventor
Malcolm Loughead
By Williams, Bradbury, McCaleb & Hinkle
Attys.

Patented Jan. 19, 1932

1,841,614

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

BRAKE MECHANISM

Application filed November 6, 1928. Serial No. 317,591.

This invention relates to a brake mechanism, and more particularly to a device for use in connection with a hydraulic brake.

In the operation of hydraulic brakes of the internal expanding type the heat generated in the brake drums during a long application of the brakes, as when the vehicle is descending down a long incline, causes the brake drums to expand so as to increase in circumference and move away from the brake shoes, requiring an increased pedal movement to maintain the shoes in the same braking relation. At the same time some of the heat is communicated to the brake fluid, causing it to expand, and driving a portion of the fluid out of the master cylinder through the vent port when the brake pedal is fully released. Upon the subsequent application of the brakes made while the brake fluid is cooling, and the brake drums are still expanded, the foot pedal may in some instances be completely depressed, striking the floor board of the vehicle without applying the required pressure on the brakes.

An object of the invention is to provide an improved brake system for overcoming these difficulties.

A further object is to provide a device for improving the operation of a hydraulic brake when the latter is applied with considerable force for an extended time.

A further object is to provide a device for maintaining the brake pedal of a vehicle slightly depressed when the brakes are to be applied for an extended time.

A further object is to provide a device for preventing the brake fluid from being expelled from the master cylinder when the fluid expands due to heat developed during the braking operation.

Other objects and advantages will appear as the description proceeds.

Figure 1:
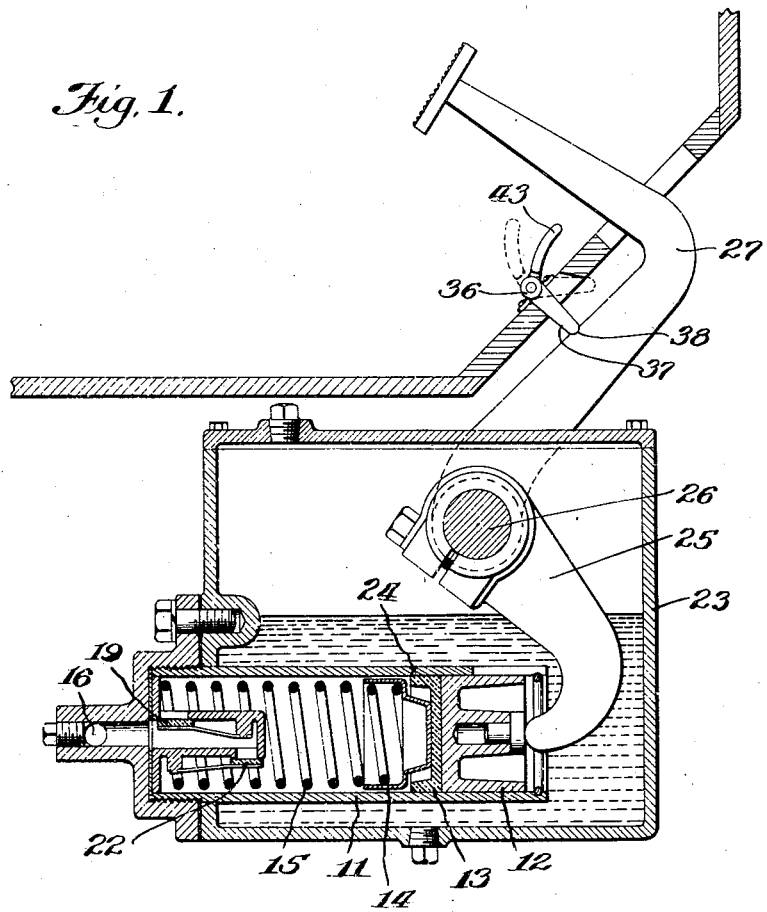
Fig. 1 is a cross section of a master cylinder assembly embodying the invention.
Figure 2:
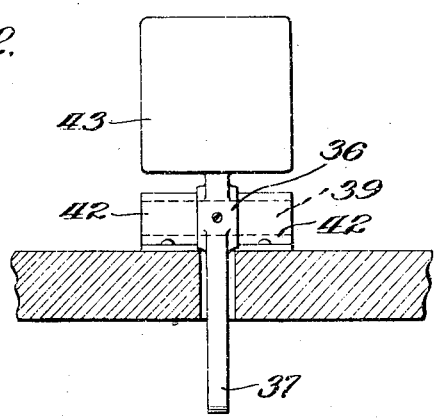
Fig. 2 is a detail view of the stop member for depressing the brake pedal.
Figure 4:
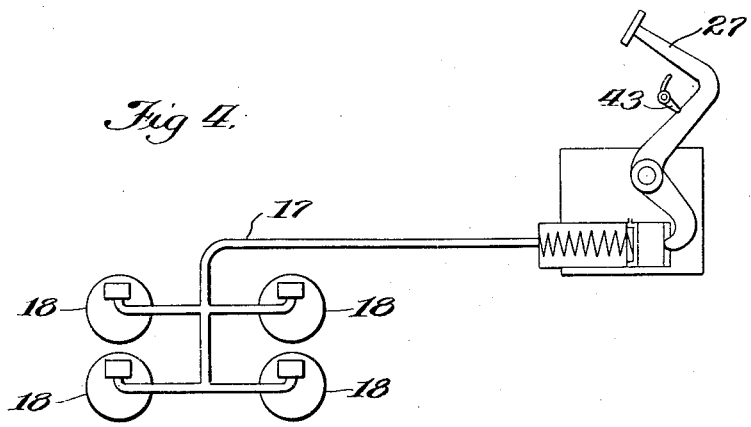
Fig. 4 is a schematic view of a hydraulic brake system embodying the invention.
Figure 3:
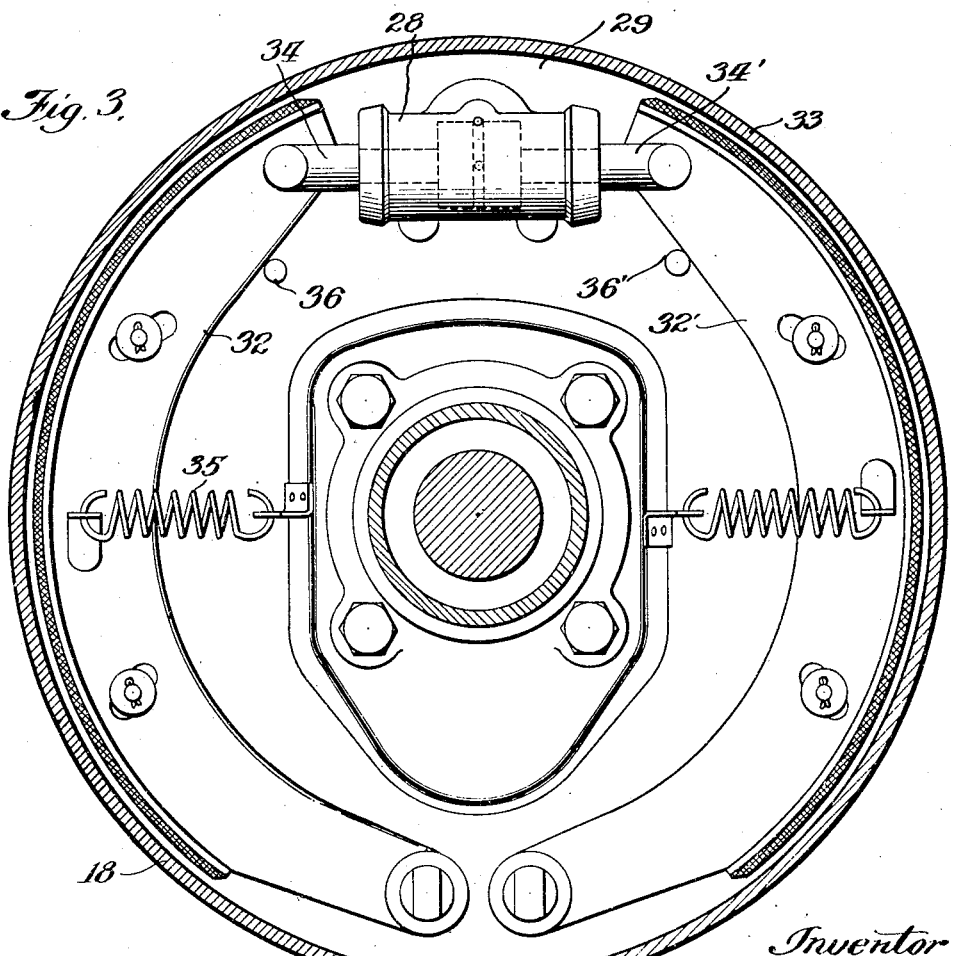
Fig. 3 is a side elevation, partly in section, of a wheel brake assembly.

Referring to the drawings in which the same reference characters indicate similar parts in the several views, a master cylinder 11 is shown having a piston 12 reciprocally mounted therein. The forward end of the piston carries a packing cup 13 having a peripheral flange engaging the walls of the cylinder for preventing the brake fluid from escaping by the piston. A metallic cup 14 abuts against the packing cup and has seated therein a coil spring 15 which serves to return the piston to its retracted position.

The forward end of the master cylinder is provided with an exhaust port 16, which leads through a tube 17 to the wheel brakes 18. At the entrance of the exhaust port is a valve 19 which allows the fluid from the master cylinder to flow under pressure to the wheel brake cylinders. The fluid is returned from the wheel brake cylinders to the master cylinder through a valve 22, which is held in place by a spring of such a tension as to require a positive pressure in the wheel brake system to return the fluid to the master cylinder.

The master cylinder is located within a fluid reservoir 23, which communicates with the master cylinder through a small vent port 24, which is located at a point immediately in front of the packing cup of the piston when the piston is in its retracted position. By this means the fluid in the brake system may be replenished to compensate for any fluid which may have escaped due to leakage in the system.

The piston 12 may be moved forwardly by an arm 25, supported on a shaft 26, which may be rotated by a foot pedal 27. Upon the depression of the foot pedal 27, the vent 24 is covered by the piston and the fluid is forced from the master cylinder to the wheel brakes. Each wheel brake has a wheel cylinder 28, which is mounted upon a support 29 carried by the vehicle. Brake shoes 32 and 32' are pivotally mounted upon the support 29 and may be engaged with a drum 33, which is carried by the wheel of the vehicle (not shown) by means of plungers 34 and 34' of the wheel cylinder 28, which engage the free ends of the brake shoes. When the pressure in the wheel cylinders 28 is released, springs 35 tend to return the brake shoes to their normal retracted positions against stop members 36 and 36'.

Upon an extended application of the brakes, the brake drum 33 becomes heated and expands, causing it to move away from the brake shoes and requiring an additional pedal movement to retain the shoes in the same braking relation with the drum. This action is partly compensated for by the fact that some of the heat is communicated to the brake fluid, causing the brake fluid to expand and move the brake shoes into closer engagement with the drums. However, if the piston of the master cylinder were permitted to move to its retracted position while the brake fluid is expanded, a portion of the brake fluid would be expelled from the master cylinder through the port 24 into the reservoir so that upon a subsequent application of the brakes while the brake fluid is cooling and the brake drums are still expanded the pedal might be completely depressed without exerting the required pressure upon the brakes.

In order to prevent the piston from returning to its retracted position under these conditions which would cause the expanded fluid to flow from the master cylinder, a stop member 36 is provided for maintaining the pedal 27 slightly depressed, thereby causing the piston 12 to stop in such a position that the vent 24 will not be uncovered. This prevents the brake fluid from being expelled from the master cylinder, and the brake shoes will not be retracted to their normal positions against the stops 36 and 36'. The increased clearance between the brake shoes and the brake drum while the drum is expanded makes it unnecessary for the shoes to be retracted against the stops at this time, and the brakes will operate the same as under ordinary conditions.

The stop device 36 comprises an arm 37 which extends through a slot in the floor board of the vehicle and is adapted to engage a small depression 38 in the pedal 27. The arm 37 is mounted upon a shaft 39, which is carried by bearing members 42 attached to the floor board. A pedal or tread member 43 is integral with the arm 37 and is located above the pivot point of the arm forming a bell crank lever therewith. The tread member 43 of the bell crank lever is made considerably heavier than the arm 37 so that it will be held by gravity in a position either to the right of the pivot shaft, as shown in full lines in Fig. 1, or to the left of the pivot shaft, as shown in dotted lines in Fig. 1. The angular movement of arm 37 is limited by the length of the slot in the floor board.

In the operation of the device, when the operator is about to descend a long incline he places his foot upon the tread member 43, moving it upwardly until the arm 37 engages the depression 38 in pedal 27. The device will then maintain this position, and the operator may apply the brakes by depressing the pedal 27, and when the brakes are temporarily released pedal 27 will strike the arm 37 so as to prevent the piston 12 from uncovering the vent 24 in the master cylinder. After the vehicle has traveled some distance without applying the brakes the operator may return the pedal 43 to its normal position by moving it away from the floor board with his foot, and the stop device will then remain in that position.

I claim:—

1. In a hydraulic brake system a master cylinder, a fluid therein, a piston movable in the cylinder to produce a pressure in the fluid for applying the brakes, means for moving said piston, said master cylinder having an aperture therein adjacent the retracted position of the piston for replenishing the fluid in the system, and means for causing said piston to maintain said aperture closed when the brakes are released, comprising an adjustable stop member operably engageable with said piston moving means to limit the return movement of the piston at a predetermined position slightly forward of its normal retracted position while permitting free forward movement of said piston moving means.

2. In a hydraulic brake system, a master cylinder having an aperture therein, a piston movable in the cylinder to produce a pressure therein for applying the brakes, means for moving said piston, a fluid reservoir communicating with the master cylinder through said aperture when the piston is in its retracted position, said piston covering the aperture in the cylinder when moved from its retracted position, and means for preventing the piston from uncovering said aperture when the brakes are released, comprising an adjustable stop member operably engageable with said piston moving means to limit the return movement of the piston at a predetermined position slightly forward of its normal retracted position, while permitting free forward movement of said piston moving means.

3. In a hydraulic brake system for a vehicle, a fluid reservoir, a master cylinder having a passage communicating with the fluid reservoir, a piston movable in the cylinder and adapted to uncover said passage in its retracted position, a manually operable pedal for moving the piston to produce a fluid pressure in the system, and a stop member operable to limit the return movement of the pedal in a slightly depressed position while permitting free forward movement thereof, thereby preventing the uncovering of the passage to the fluid reservoir.

4. In a hydraulic brake system for a vehicle, a fluid reservoir, a master cylinder having a piston movable therein and provided with a vent located immediately in front of the released position of the piston, a manually operable pedal for moving the piston to produce a fluid pressure in the system and a pivoted bell crank stop member selectively operable into engagement with said pedal to limit the return movement thereof in a predetermined position forward of its normal return position and permit unrestrained forward movement of said pedal, thereby causing the piston of the master cylinder to keep the vent to the fluid reservoir closed.

5. In a hydraulic brake system for a vehicle, a fluid reservoir, a master cylinder having a piston movable therein and provided with a vent communicating with the fluid reservoir and located immediately in front of the retracted position of the piston, a manually operable pedal for moving the piston in the master cylinder, and a stop member for engaging the pedal to prevent its return to normal position, thereby keeping the vent in the cylinder closed, said stop member comprising a pivot shaft, an arm for engaging the pedal, and a tread member movable to either of two positions, forming a fixed angle with said arm and located above the pivot shaft so that it will be held by gravity in either of its two positions.

In witness whereof, I hereunto subscribe my name this 1st day of November, 1928.

MALCOLM LOUGHEAD.